United States Patent Office 3,798,220
Patented Mar. 19, 1974

3,798,220
PROCESS FOR PREPARING 4-HYDROXY 5-SUBSTITUTED PYRIMIDINES AND PRODUCTS OBTAINED
Kurt Klemm and Erhard Langenscheid, Constance, Germany, assignors to Byk-Gulden Lomberg Chemische Fabrik G.m.b.H., Constance, Germany
No Drawing. Continuation-in-part of application Ser. No. 864,168, Oct. 6, 1969. This application Nov. 4, 1969, Ser. No. 874,077
Claims priority, application Germany, Nov. 4, 1968, P 18 06 867.2
Int. Cl. C07d
U.S. Cl. 260—251 R                    14 Claims

ABSTRACT OF THE DISCLOSURE

The process is useful to make intermediates useful to make drugs.

4-hydroxy 5-substituted pyrimidines of the formula

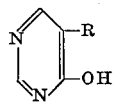

wherein R is —CN, —COOR$_1$ or —CONR$_1$R$_2$ in which R$_1$ and R$_2$ are the same or different alkyl groups, preferably lower alkyl containing up to 4 carbons; cycloalkyl or aryl, such as cyclohexyl, phenyl, benzyl, etc.; or when taken together with the N atom to which they are attached, are morpholino, piperidino, piperazino or N-methylpiperazino which are prepared by reacting an acid amide of the formula R—CH$_2$—CONH$_2$ with an acid amide O,O-acetal of the formula OR$_3$OR$_4$CH—N(R$_3$)(R$_4$) or an acid amide O,N-acetal of the formula $$(OR_3)CH(N(R_3)(R_4))_2$$

wherein R$_3$ and R$_4$ may be the same as R$_1$ and R$_2$, preferably lower alkyl, to form a compound of the formula

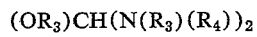

and subjecting said compound to ring closure, preferably with an ammonium salt solution or an ammonium salt solution containing ammonia, to form the pyrimidine ring by splitting off the two secondary amines $$HN(R_3)(R_4)$$

This is a continuation-in-part of pending application Ser. No. 864,168 filed Oct. 6, 1969 entitled, "Process for Preparing 1 - Dialkylamino - 5 - Dialkylimonio-2-Cyano-3-Chloro-4-Azapenta-1,3-Diene."

This invention relates to a class of new and valuable 4-hydroxy 5-substituted pyrimidines coming within the scope of the formula (I)

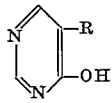

wherein R is —CN, —COOR$_1$ or —CONR$_1$R$_2$ in which R$_1$ and R$_2$ are the same or different alkyl groups, preferably lower alkyl, containing up to 4 carbons; cycloalkyl, such as cyclohexyl, phenyl, benzyl, etc.; or when taken together with the N atom to which they are attached, are morpholino, piperidino, piperazino or N-methylpiperazino, and to a method of making the compounds of Formula I.

Chemische Berichte, 1965, pages 3883–3887 discloses a procedure for preparing certain substituted 4-hydroxy pyrimides according to which acidic hydrocarbons similar to cyanoacetamides and malonic acid ethyl ester amides are reacted with tris-formamino-methane. In the first type of reaction, 4-hydroxy-5-cyano-pyrimidine is obtained in a 7.3% yield; in the second type of reaction, 4-hydroxy-5-ethoxycarbonyl pyrimidine is obtained in an 11% yield.

An important object of the invention is to provide a method of preparing substituted 4-hydroxy pyrimidines which is remarkably efficient as compared to the method described in the aforesaid journal and produces the compounds in higher yields, generally in the order of magnitude of 80%. The method is also very versatile in that it produces a large number of various new substituted 4-hydroxy pyrimidines heretofore unavailable.

The method of the invention comprises reacting an acid amide of the formula R—CH$_2$—CONH$_2$, wherein R is defined hereinabove, with an acid amide O,O-acetal of the formula OR$_3$OR$_4$CH—N(R$_3$)(R$_4$) or an acid amide, O,N-acetal of the formula $$(OR)_3CH(N(R_3)(R_4))_2$$

wherein R$_3$ and R$_4$ are the same or different alkyl groups, preferably lower alkyl, in a molar ratio of 1:2 to 1:4 preferably 1:3 to 1:4 to form a compound of the general formula (II)

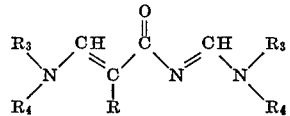

wherein R, R$_3$ and R$_4$ are defined hereinbefore and may be the same or different.

The final products of Formula I are obtained by subjecting the compounds of Formula II to a cyclization or ring closure reaction to form the pyrimidine ring, such for example as with a base, preferably an ammonium salt solution or an ammonium salt solutation containing ammonia.

Schematically the reaction of the invention may be represented as follows:

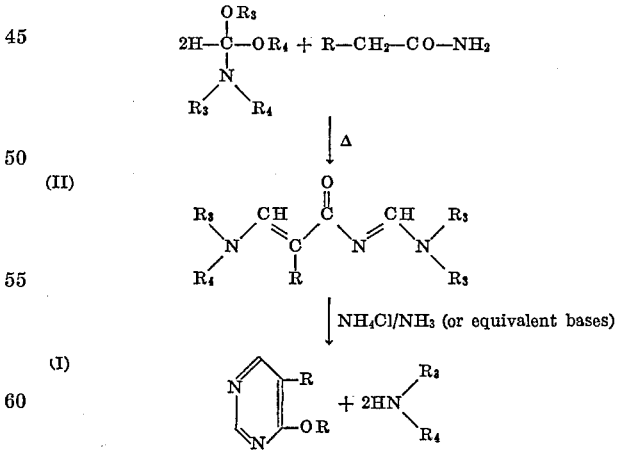

wherein R is —CN, —COOR$_1$ or —CONR$_1$R$_2$ is which R$_1$ and R$_2$ are the same or different alkyl groups, preferably lower alkyl containing up to 4 carbons; cycloalkyl or aryl, such as cyclohexyl, phenyl, benzyl, etc.; or when taken together with the N atom to which they are attached, are morpholino, piperidino, piperazino or N-methylpiperazino; and R$_3$ and R$_4$ are the same or different alkyl.

In one typical embodiment of the method of the invention, a mixture of cyanoacetamide and dialkylformamide acetal, in a preferred molar ratio of about 1:3, is heated in the temperature range of 20 to 100° C., preferably 40° C., yielding, upon cooling the compound of Formula II. Where the reactants are cyanoacetamide and dimethylformamidedimethylacetal, the compound N-((α-dimethylaminomethylene) - cyanoacetyl) - N',N' - dimethylformamidine is obtained in about a 90% yield.

In accordance with the invention, the compounds of Formula II are then subjected to the action of an ammonium salt solution or an ammonium salt solution containing ammonia. The reaction mixture is heated in the temperature range of 20 to 100° C., preferably 100° C., for a relatively short time, e.g. about 15 minutes, to produce the substituted 4-hydroxy-5-cyano-pyrimidine. The precipitated compound may suitably be purified by reprecipitation from an aqueous mineral acid solution, such as hydrochloric acid, preferably at a pH of about 5, and then washing with methanol. A typical yield of the pure compound is about 80%.

In another embodiment of the method of the invention, malonic acid amides, particularly the malonic acid ester amides are used as starting materials instead of cyanoacetamide. The malonic acid amides are reacted with dialkylformamide-dialkylacetal, preferably in molar ratios of about 1 to about 4, at temperatures of about 20° C. to about 100° C., preferably about 50° C. to about 60° C. yielding compounds of Formula II. Where the reactants are malonic acid ethyl ester amide and dimethylformamide - dimethylacetal N-((α-dimethylaminomethylene) - carbethoxyacetyl) - N',N' - dimethylformamidine is obtained in yields of about 68%.

In accordance with the invention, the compound obtained is then reacted with a base, preferably saturated, aqueous ammonium chloride, solution at a temperature range of 20 to 100° C., preferably at about room temperature, whereby 4-hydroxy-5-ethoxycarbonyl-pyrimidine precipitates out and is recovered in pure form by recrystallization from water in a typical yield of more than about 76%.

It is not necessary, but more efficient to isolate the compounds of Formula II from the reaction mixture. Said compounds may also be subjected to ring closure directly in the reaction mixture.

The following are non-limitative examples of the invention.

EXAMPLE 1

4-hydroxy-5-cyano-pyrimidine (a) 20 parts by weight of cyanoacetamide is heated with 85 parts by weight of dimethylformamide-dimethylacetal for 90 minutes at 40° C. Upon cooling the reaction mass to 10° C. the precipitate is filtered with suction and washed with petroleum ether (B.P.=40–70° C.). 41.5 parts by weight (90% of theory) of N-((α-dimethylaminomethylene) - cyanoacetyl)-N',N'-dimethylformamidine of M.P. 133–135° C. is obtained. This compound is then dissolved in 200 ml. water and treated with 51 ml. of 60% perchloric acid whereby 60.5 parts by weight (86.5% of theory) of N-((α-dimethylaminomethylene)-cyanoacetyl) - N',N' - dimethylformamidine perchlorate having a decomposition point of 195° C. is obtained, after filtering the precipitate with suction and drying it in vacuum.

(b) 10 parts by weight of the compounds obtained in (a) above is heated with 92 parts by weight (85 parts by volume) of saturated aqueous ammonium chloride solution and 6 parts by weight (6.7 parts by volume) of 25% aqueous ammonia for 15 minutes to about 100° C. The reaction mixture is cooled to about 5° C. and the precipitate is filtered off under suction. The precipitate is dissolved in 30 ml. water and acidified with half-concentrated hydrochloric acid to a pH of about 5. The precipitate formed is filtered off under suction and washed with some cold methanol. 3.3 parts by weight (80.5% of theory) of 4-hydroxy-5-cyanopyrimidine having a M.P. of 242–245° C. is recovered.

EXAMPLE 2

4-hydroxy-5-ethoxycarbonyl-pyrimidine (a) 2.5 parts by weight of malonic acid ethyl ester amide is agitated with 11 parts by weight of dimethylformamide-dimethylacetal for 1 hour at about 60° C. Upon cooling to about 10° C., the precipitate is filtered under suction and recrystallized from toluene. 3.1 parts by weight (68% of theory) of N-((α-dimethylaminomethylene) - carbethoxy - acetyl) - N',N'-dimethyl-formamidine having a M.P. of 144–146° C. is obtained.

(b) 3 parts by weight of the compound obtained in (a) above are agitated with 24 parts by volume of saturated aqueous ammonium chloride solution for about 2 hours at about room temperature. The precipitate formed is filtered under suction and recrystallized from water. 1.8 parts by weight (76.3% of theory) of 4-hydroxy-5-ethoxycarbonylpyrimidine having a M.P. of 190–191° C. is obtained.

EXAMPLE 3

The same reaction as that illustrated in Example 1 is carried out except that the N-((α-dimethylaminomethylene)-cyanoacetyl)-N',N'-dimethylformamidine is not converted to the perchlorate addition product before subjecting it to the ring closure step (b) illustrated in that example.

The procedural steps illustrated in the foregoing examples are carried out with the following dialkylformamide O,O-acetals or the corresponding dialkylformamide O,N-acetals which are substituted for the dimethylformamide - dimethylacetal, viz: diethylformamide - diethylacetal, diethyl formamide-dimethylacetal, dipropylformamide - dipropylacetal, dibutylformamide-dimethylacetal and dibutylformamide-diethylacetal and other suitable compounds.

It is known from the literature, that in the production of aminomethylene derivatives of CH-acid compounds formamide O,N-acetals may be used as well as formamide-O,O-acetals with the same results.

(1) H. Bredereck, F. Effenberger, D. Zeyfang and K. A. Hirsch, Chemische Berichte 101, 4036 (1968);
(2) H. Bredereck F. Effenberger and H. Botsch, Chemische Berichte 97, 3397 (1964).

The reaction of the invention proceeds in like manner with other suitable amides of the formula

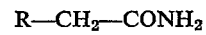

R—CH₂—CONH₂ which are substituted for the cyanoacetamide or malonic acid ethyl ester amide of the foregoing examples and produce the following typical new 4-hydroxy-5-substituted pyrimidines, viz:

4-hydroxy-5-methoxycarbonyl pyrimidine,
4-hydroxy-5-isopropyloxycarbonyl pyrimidine,
4-hydroxy-5-benzyloxycarbonyl pyrimidine,
4-hydroxy-5-(N',N'-dimethylformamididino)pyrimidine,
4-hydroxy-5-(N',N'-diethylformamidino)pyrimidine,
4-hydroxy-5-morpholinocarbonyl pyrimidine,
4-hydroxy-5-piperidinocarbonyl pyrimidine, and
4-hydroxy-5-pyrrolidinocarbonyl pyrimidine.

It should also be noted that in the compounds of Formulas I and II, the groups $R_1$, $R_2$, $R_3$ and $R_4$ are inert in that they are not functional groups which take part as such in the reaction. The products II which are formed reflect the nature of said formamide reactants in their substituents $R_3$ and $R_4$ and in the nature of the secondary amine formed in the products I, wherein R represents the substituent of the acetamide reactant.

The hydroxy-substituted pyrimidines also are useful for conversion to halopyrimidines (see for instance U.S. Pat. 3,254,087) which in turn are useful starting reactants for the preparation of aminopyrimidines and diazadibenzodiazepine, which are useful antidepressants. The hydroxy-substituted pyrimidines are useful for preparing pesticides (known under such names as Diazinon, Dursban and Cynem) phosphorothioic acid (O,O-diethyl-O-)2-isopropyl - 6 - methyl - 4 - pyrimidinylester, phosphorothioic acid, O,O-diethyl-O-(3,5,6 - trichloro - 2 - pyridyl)-ester, phosphorothioic acid O,O-diethyl-O-(2-pyrazinyl)-ester, respectively, upon phosphorylation of their phenolic hydroxyl group with phosphoric acid diester halogenides or thiophosphoric acid diesters halogenides.

The compounds of Formula I are useful by virtue of their characteristic cyano, ester or amido groups and further by virtue of their hydroxyl groups which undergo reactions typical thereof. Furthermore, the compounds of Formula I are useful in the production of the compounds disclosed in U.S. Pat. No. 3,523,119 issued Aug. 4, 1970.

What is claimed is:

1. A method of preparing 4-hydroxy-5-substituted pyrimidines of the formula (I) 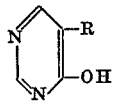

wherein R is —CN, —COOR$_1$ or CONR$_1$R$_2$ in which R$_1$ and R$_2$ are the same or different alkyl, cycloalkyl or phenyl, said alkyl having 1 to 4 carbon atoms, and said cycloalkyl having up to 6 carbon atoms comprising reacting at a temperature in the range of about 20 to 100° C. an acid amide of the formula R—CH$_2$—CO—NH$_2$ wherein R is as defined above, with an acid amide O,O-acetyl of the formula (OR$_3$)(OR$_4$)—CH—N(R$_3$)(R$_4$) or an acid amide, O,N-acetal of the formula (OR$_3$)CH(NR$_3$R$_4$)$_2$ wherein the acid amide and the acetal are in the ratio of about 1:2 to 1:4, wherein R$_3$ and R$_4$ are selected from the group consisting of the same or different alkyl groups of 1 to 4 carbon atoms, morpholino, piperidino, piperazino or N-methyl piperazino to form a compound of the formula (II) 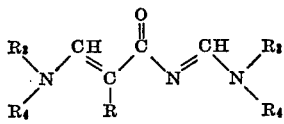

and subjecting said compound of Formula II to ring closure by reacting said compound at a temperature of about 20 to 100° C. with an ammonium salt solution to form the pyrimidine ring by splitting off the two secondary amines HN(R$_3$)(R$_4$) to produce the 4-hydroxy-5-substituted pyrimidines of Formula I.

2. The method of claim 1 wherein R$_3$ and R$_4$ are the same as R$_1$ and R$_2$.

3. The method of claim 1 wherein R$_3$ and R$_4$ are methyl.

4. The method of claim 1 wherein the compound of Formula II is first separated from the reaction mixture and then subjected to ring closure.

5. The method of claim 1 wherein the compound of Formula II is first separated from the reaction mixture, treated with perchloric acid to form a salt of the said compound and the salt then subjected to ring closure.

6. The method of claim 1 wherein R is —CN.

7. The method of claim 1 wherein R is —COOR$_1$ and R$_1$ is alkyl.

8. The method of claim 1 wherein R is —CONR$_1$R$_2$ and R$_1$ and R$_2$ are alkyl.

9. The method of claim 1 wherein the acid amide is cyanoacetamide and the same is reacted with dimethylformamide-dimethylacetal.

10. The method of claim 1 wherein the acid amide is malonic acid ethyl ester amide and the same is reacted with dimethylformamide-dimethylacetal.

11. The method of claim 1 wherein the molar ratio of the acid amide to the dialkylformamideacetal is 1:3 to 1:4.

12. The method of claim 1 wherein the ring closure is effected with the use of an ammonium chloride solution.

13. The method of claim 12 wherein the ring closure is effected with the use of an ammonium chloride solution containing additionally free amounts of ammonia.

14. The process of claim 1 wherein R$_3$ and R$_4$ taken together with the nitrogen atom to which they are attached form morpholino, piperidino, piperazino, or N-methylpiperazino.

References Cited
UNITED STATES PATENTS
3,523,119  8/1970  Jutz et al. _____ 260—256.4

ALEX MAZEL, Primary Examiner
R. V. RUSH, Assistant Examiner

U.S. Cl. X.R.
260—246 B, 268 H, 293.63, 326.3, 256.4 C, 465.4, 482 R